UNITED STATES PATENT OFFICE.

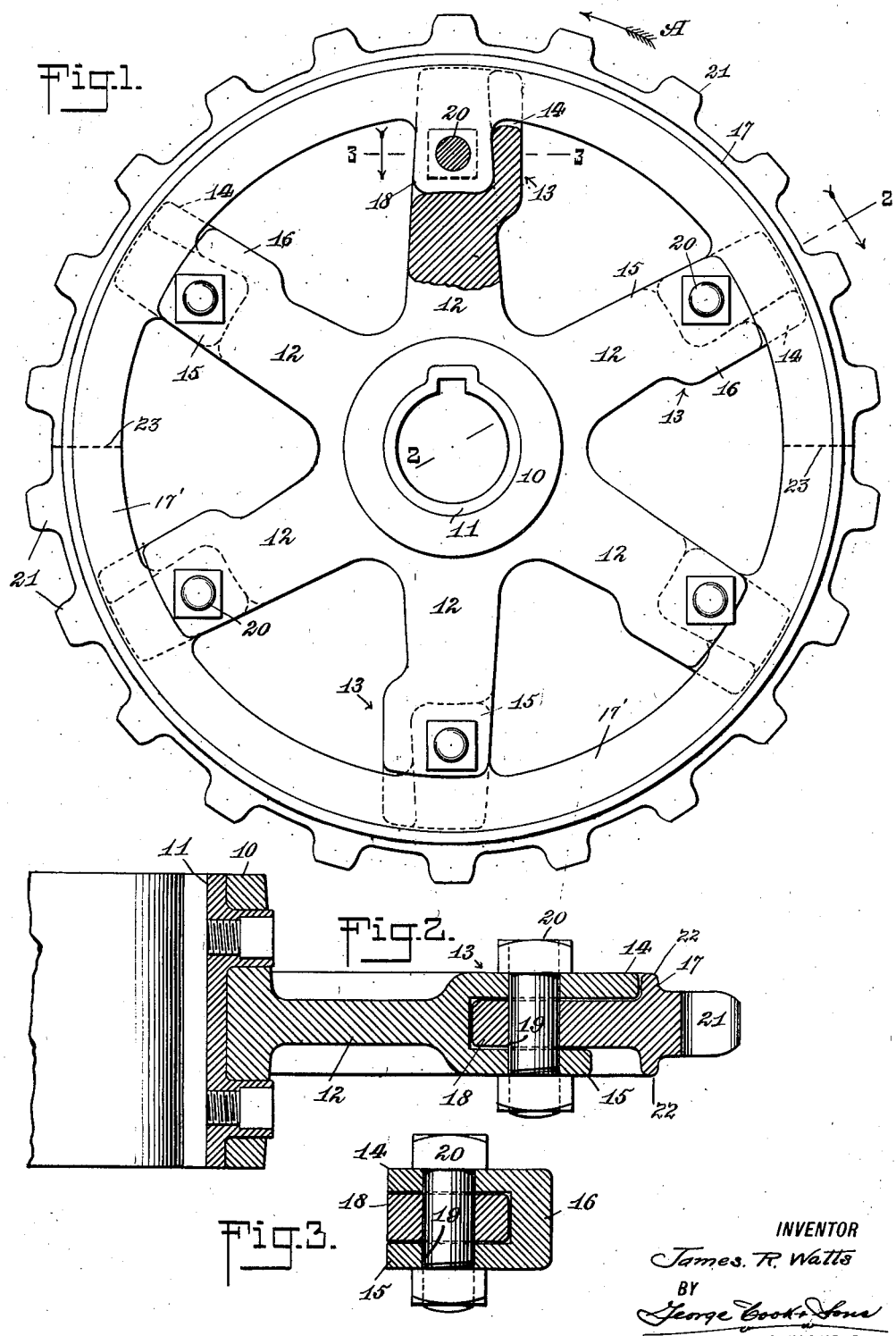

JAMES RALPH WATTS, OF NEW CASTLE, DELAWARE, ASSIGNOR TO AMERICAN MANGANESE STEEL COMPANY, OF AUGUSTA, MAINE, A CORPORATION OF MAINE.

SHEAVE, SPROCKET, OR GEAR CONSTRUCTION.

1,378,156. Specification of Letters Patent. Patented May 17, 1921.

Application filed October 29, 1920. Serial No. 420,385.

*To all whom it may concern:*

Be it known that I, JAMES RALPH WATTS, a citizen of the United States, and a resident of New Castle, in the county of New Castle and State of Delaware, have made and invented certain new and useful Improvements in Sheave, Sprocket, or Gear Construction, of which the following is a specification.

My invention relates to a sheave, sprocket, or gear construction.

An object of my invention is to provide a wheel of the above-mentioned character wherein the rim, having become worn in service, may be removed from the hub and spokes and either reversed so as to afford additional service, or discarded, allowing a new rim to be inserted in place. Thus considerable saving is effected over sheaves, sprockets, gears, or similar wheels which are provided with integral rims which, having become worn beyond service, require that an entire wheel be scrapped.

A further object of my invention is to provide a wheel of the above-mentioned character wherein the rim may be formed of two or more parts, so that it may be reversed or discarded and a new rim replaced without requiring that the hub be removed from the sheave, which is of particular importance when the ends of the shaft are not free.

A further object is to provide a wheel of the above-mentioned character wherein the removable rim may be easily and readily alined with the hub and spokes and, having been properly alined, may be slightly rotated to occupy a seated position and in which position it may be securely locked by the use of bolts or similar means.

A further object is to provide a wheel of the character described which is so constructed and arranged that the rim may be securely locked to the spokes and hub and the bolts or pins by means of which such locking is effected are not exposed to the forces incident to the transmission of power from the hub to the rim and are not exposed to the forces and strains tending to exert a side thrust upon the rim, the latter being of particular importance in such cases as when the rim is provided with beveled teeth and acting as a beveled gear.

With the foregoing and other objects in view, my invention consists in the improved wheel construction illustrated in the accompanying drawing and described in the following specification, and in the combination and arrangement of parts and in the details of construction as hereinafter described and claimed, it being understood that changes may be made within the scope of the claims without departing from the spirit of the invention.

The preferred embodiment of my invention is disclosed in the accompanying drawings, wherein:

Figure 1 is a view in elevation and partially in section of a wheel embodying the characteristic features of my invention;

Fig. 2 is a view in transverse section taken on the line 2—2 of Fig. 1; and

Fig. 3 is a view in transverse section taken on the line 3—3 of Fig. 1.

Referring specifically to the several views, wherein similar reference numerals designate corresponding parts througout, my improved wheel is composed of a hub 10, having the usual type of bushing 11 therein. The hub 10 is also provided with the spokes 12 radiating therefrom and which form a part thereof, and which are provided with the enlarged outer and rim-engaging ends 13.

Each spoke end is formed with the spaced side walls 14, 15, the wall 14 projecting beyond the wall 15, and the two being joined by the rear wall 16, the latter acting as a driving abutment, as will presently appear. The wheel rim 17 is provided with the inwardly projecting web 17′ and spoke attaching plates 18, the latter being adapted to fit between the walls 14 and 15 and contact with the abutment wall 16. The walls 14 and 15 and attaching plates 18 are each provided with the alined openings 19 therein, through which extend the holding bolts or pins 20, thereby rigidly locking the rim in assembled position upon the wheel hub and spokes.

I have illustrated the rim 17 as being provided with the sprocket teeth 21, although it will be readily appreciated that the rim may be provided with other means for the transmission of power, as, for example, gear teeth, so as to engage an adjoining gear, a grooved rim, so as to engage a rope or cable, or in other ways equipped for the transmission of power. My improved wheel as thus constructed is adapted to drive or transmit power and when turning in the direction indicated by the arrow will transmit power from the hub to the rim without the forces incident to such transmission of power being brought to bear upon the locking bolts 20, thus preventing the bolts from becoming worn and the rim from becoming loose upon the hub.

The wheel rim is provided with the outstanding flanges 22, which are adapted to receive the extremities of the walls 14 of the spokes thereunder and to contact therewith. With the parts as thus constructed, the rim may be readily positioned upon the spokes by placing the rim with the attaching plates 18 slightly in advance of the spoke ends and moving the rim toward the hub until the web 17 is passed over the walls 15 of the spokes and bears against the walls 14 thereof. The rim in moving into such position is alined or centralized with respect to the hub by the extremities of the walls 14 passing beneath and contacting with the flanges 22 of the rim, so that a slight rotation or turning of the rim with respect to the hub will then cause the attaching plates to seat within the pockets formed by the side walls 14—15 and rear walls 16 of the spoke extremities. The bolts or pins 20 may be then inserted through the alined openings and the rim securely locked in proper position. With the rim as thus assembled upon the hub, such side thrusts as may be brought to bear upon the rim will be taken up by the side walls of the spoke extremities and will not be transmitted to nor affect the holding bolts 20. In the same manner, the varying shocks and loads incident to the transmission of power from the hub to the rim, or from the rim to the hub, will be directly taken up by the rear walls 16 and will not tend to loosen nor wear the attaching plates.

In those instances where my improved wheel is to be used in connection with a shaft in which the rim cannot be readily passed over the shaft ends, I prefer to form the rim in two or more parts, as indicated by the dotted lines 23. I do not, however, wish to limit myself to the structural details of the rim joints 23 and so have indicated them in dotted lines only.

Having thus fully described my invention, I claim and desire to secure by Letters Patent:

1. A wheel of the character described comprising a hub and spokes, said spokes each provided at their outer extremities with spaced side walls, and a rear abutment wall, a detachable rim with portions thereof adapted to extend between said side walls and contact with said abutment walls of the spoke extremities, and means for locking said rim to said spokes.

2. A wheel comprising a hub and spokes, said spokes provided at their outer extremities with a projecting wall and a transverse abutment, a rim having an inwardly extending web adapted to lie against the said projecting wall of the spokes, inwardly extending plates carried by said web and bearing against said transverse abutments, and means for holding the rim and spokes in assembled position.

3. A wheel of the character described comprising a hub and spokes, the outer extremities of said spokes provided with spaced side walls and a rear wall extending therebetween, a detachable rim provided with inwardly extending attaching plates fitting between the side walls of the spokes and abutting with the rear wall thereof, and means for locking the attaching plates in assembled position.

4. A wheel of the character described comprising a hub and spokes, the outer extremities of said spokes provided with spaced side walls of unequal length and a rear wall extending between said side walls, and a removable rim provided with inwardly extending attaching plates adapted to seat between the side walls of the spoke and contact with the rear walls thereof, and means for locking said attachment plates in position between said side walls.

5. A wheel comprising a hub, rim supporting members thereon and provided at their outer extremities with spaced side walls of unequal length, a rim arranged for the transmission of power and having an inwardly extending web adapted to pass over the shorter of the spaced side walls and contact with the longer of said side walls, attaching plates carried by said web and fitting between said side walls, and means for locking the rim in assembled position upon said rim supporting members.

6. A wheel comprising a hub and rim supporting members, said members provided at their outer extremities with spaced side walls of unequal length and with a rear wall extending between said side walls, and a removable rim including a web having inwardly extending attaching plates adapted to seat between the side walls and contact with the rear walls of said rim supporting members, said rim provided with an outwardly extending flange, the longer walls of the rim supporting members' ends adapted to lie against the rim web and project beneath and contact with the rim flange, and means for locking the rim in assembled position upon said rim supporting members.

7. A detachable rim for wheels of the character described including a web having inwardly extending attaching plates and an outwardly extending flange, said attaching plates provided with openings extending therethrough for the reception of holding bolts.

8. A spider for a wheel of the character described comprising a hub and outwardly extending spokes, said spokes provided at their extremities with spaced side walls of unequal length, and a rear wall extending between the side walls and approximately equal in height to the height of the smaller of the side walls, said side walls provided with alined openings extending therethrough.

Signed at New Castle in the county of New Castle and State of Delaware this 26th day of October A. D. 1920.

JAMES RALPH WATTS.

Witnesses:
  GEO. T. COMLY,
  H. BUTLER.